Patented May 26, 1925.

1,539,689

UNITED STATES PATENT OFFICE.

PAUL NAWIASKY AND KARL SAURWEIN, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF VAT COLORING MATTERS.

No Drawing.   Application filed October 23, 1923.  Serial No. 670,243.

*To all whom it may concern:*

Be it known that we, PAUL NAWIASKY and KARL SAURWEIN, citizens of Austria and the German Empire, respectively, residing at Ludwigshafen-on-the-Rhine, Germany, have invented new and useful Improvements in the Manufacture of Vat Coloring Matters, of which the following is a specification.

We have found that the anthraquinone-carboxylic acid amids in which a hydrogen atom of the amid group attached to carbonyl is substituted by an anthraquinone residue, corresponding to the formula

A—CO—NH—A′ in which formula A and A′ are anthraquinone residues, represent valuable vat coloring matters provided one of these anthraquinone residues, or both, contain an amino group or more than one amino group, which may be either a primary amino group or substituted by any radical other than an anthraquinone carboxylic acid residue. Other substituents may also be present in the anthraquinone residues or either of them. These vat coloring matters generally produce red shades, but other colors, such as orange and violet, may also be obtained. They produce deep dyeings with very good, in some cases excellent fastness. The products of the aforesaid kind may be produced in various ways following the generally known methods. They may be prepared by the interaction of an amino-anthraquinone (whether substituted in the nucleus, or not) and an amino-anthraquinone carboxylic acid or its chlorid, which reaction may take place while employing condensing agents. And anthraquinone carboxylic acid (or its chlorid) or an amino-anthraquinone containing an interchangeable group may be condensed to form the body A—CO—NH—A′, replacing subsequently the interchangeable group (such as halogen) by the amino group or, if a nitro group, reducing it to form an amino group, or the body A—CO—NH—A′ may be nitrated, and the nitro compound thus obtained reduced. Another way of producing the desired amino derivative consists in causing an anthraquinone derivative containing a reactive group to react with an anthraquinone-carbonyl amid, but any other suitable method may also be used.

The following examples serve to further illustrate the invention which latter, however, is not restricted to these examples. The parts are by weight.

*Example 1.*

10.6 parts of 1-aminoanthraquinone-2-carboxylic acid and 300 parts of nitrobenzene are heated to about 100 degrees centigrade, 9 parts of phosphorus pentachlorid are then added, whereupon a disengagement of hydrochloric acid gas takes place. 9 parts of 1-aminoanthraquinone are then added and the mixture is maintained at 100 degrees centigrade for a short while. The mass is then allowed to cool, the reaction product is filtered off and crystallized from anilin. It is an orange vat dyestuff possessing an excellent fastness to light.

The formation of the dyestuff described in this example is represented by the following equations with structural formulas:

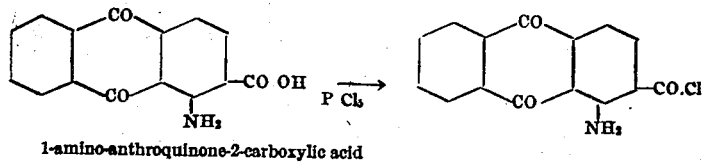
1-amino-anthroquinone-2-carboxylic acid

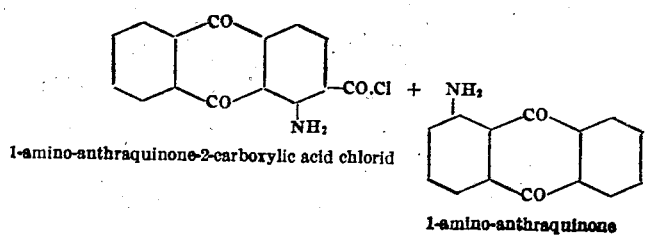
1-amino-anthraquinone-2-carboxylic acid chlorid 1-amino-anthraquinone

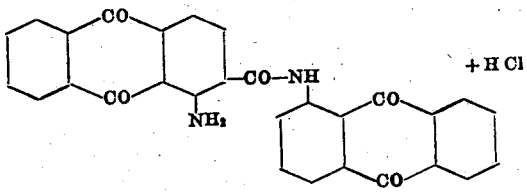

Example 2.

22.3 parts of 1-aminoanthraquinone are dissolved in 150 parts of boiling nitrobenzene, and 30.5 parts of 1-chloro-anthraquinone-2-carbonyl chlorid are then added. The mixture is kept at boiling point for 20 minutes, while stirring, then cooled, the reaction product filtered off, washed with benzene, and dried. It is then mixed with 1000 parts of nitrobenzene, 34 parts of toluene-para-sulfonamid, 20 parts of potassium acetate and 2 parts of copper powder and heated to boiling for 8 hours. The mass is then cooled down to 30 degrees centigrade, the condensation product filtered off, washed and dried. The toluene-sulfonic derivative is then saponified by dissolving it in ten times its weight of sulfuric acid of 66 degrees Baumé, heating at between 80 degrees and 90 degrees centigrade for half an hour, then pouring into water, filtering, washing and drying. The coloring matter can finally be purified by recrystallizing from anilin. It is identical, in its properties, with the dyestuff obtained according to Example 1. The formation of the dyestuff described in this example is represented by the following equations with structural formulas:

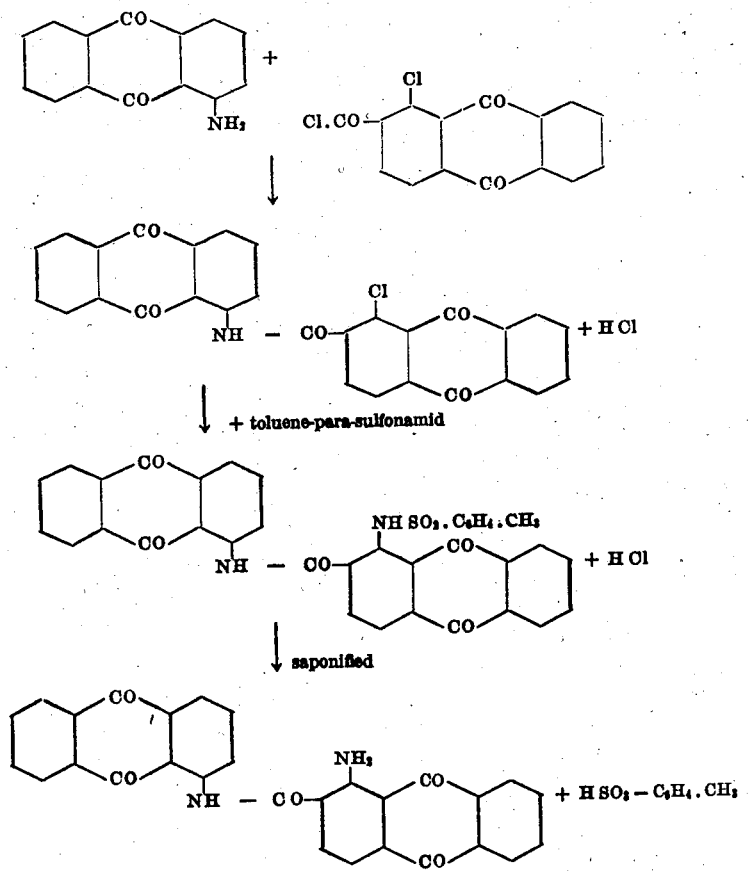

Example 3.

20 parts of the condensation product of 1-chloro-anthraquinone-2-carboxylic acid chlorid and 2-aminoanthraquinone prepared in an analogous manner as described in Example 2 are heated, in an autoclave provided with a stirrer, to 160 degrees centigrade, with 300 parts of aqueous ammonia of 20 per cent and 0.5 parts of cuprous chlorid. When cool, the reaction product is filtered off, washed and dried and recrystallized from anilin. It is a vat coloring matter dyeing cotton bluish red shades.

The formation of the dyestuff described in this example is represented by the following equations with structural formulas:

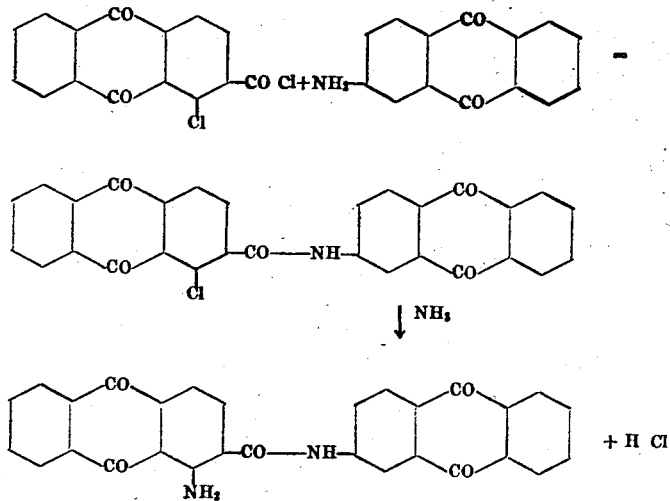

Example 4.

5 parts of 1-amino-4-methoxy-anthraquinone are dissolved in 60 parts of boiling nitrobenzene and 6.2 parts of 1-nitro-anthraquinone-2-carboxylic acid chlorid added thereto. The mixture is boiled for 20 minutes, then cooled, the reaction product filtered off, washed with benzene and dried. The product can directly serve as a vat coloring matter or preferably it is beforehand subjected to a reduction treatment to reduce the nitro group. It dyes cotton clear bluish red shades.

With 1-amino-8-hydroxy-anthraquinone instead of 1-amino-4-methoxy-anthraquinone a bright orange dyestuff is obtained, and with 1.5-diamino-4.8-dihydroxy-anthraquinone a violet coloring matter, with 1.4-diamino-anthraquinone a claret red vat dyestuff. The formation of the dyestuff described in this example is represented by the following equations with structural formulas:

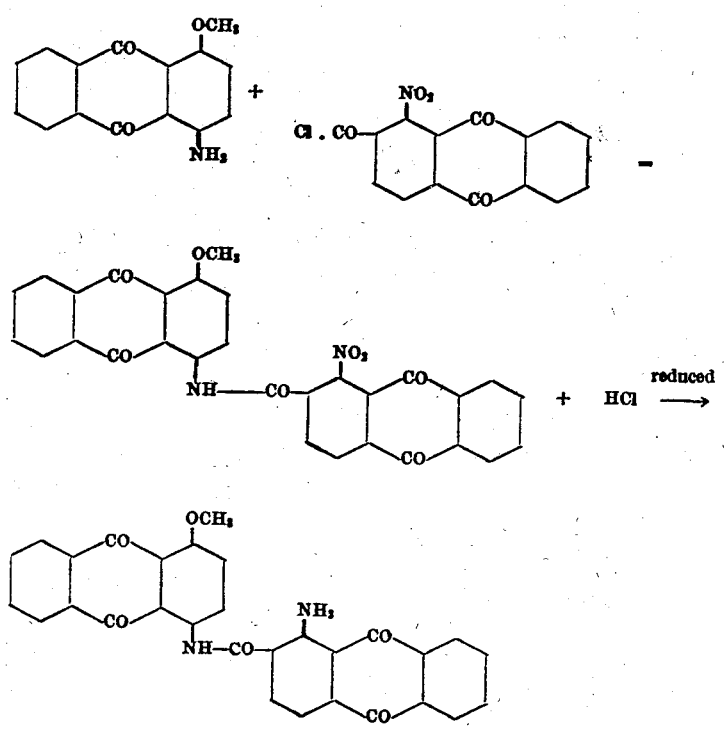

With 1.5-diamino-4.8-dihydroxy-anthraquinone the equation is as follows:

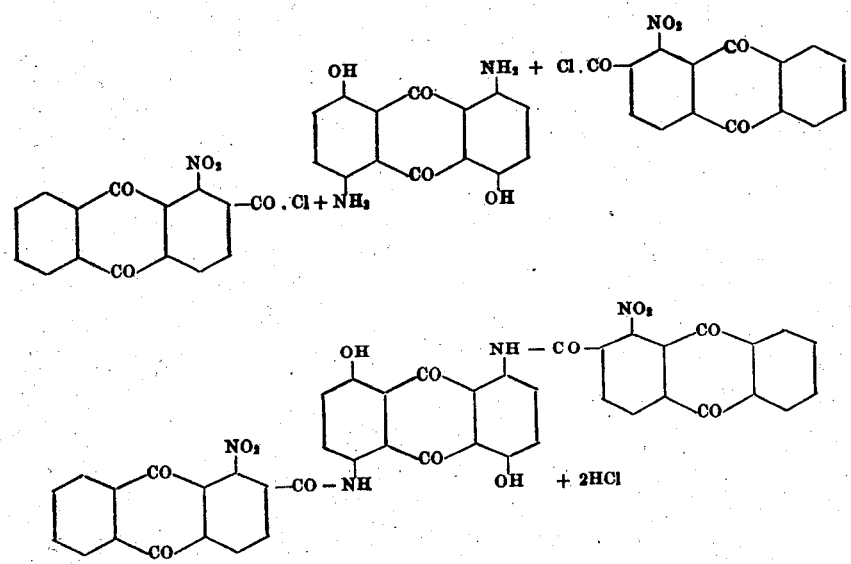

subsequently reducing —NO$_2$ (twice) to —NH$_2$ (twice).

*Example 5.*

24 parts of 1-nitro-4-amino-anthraquinone are dissolved in 500 parts of boiling trichlorbenzene and 27 parts of anthraquinone-2-carboxylic acid chlorid added at boiling temperature. Boiling is continued for half an hour, then the mixture is allowed to cool and worked up in the manner described in the foregoing examples. A reddish violet vat dyestuff is obtained. The formation of the dyestuff described in this example is represented by the following equations with structural formulas:

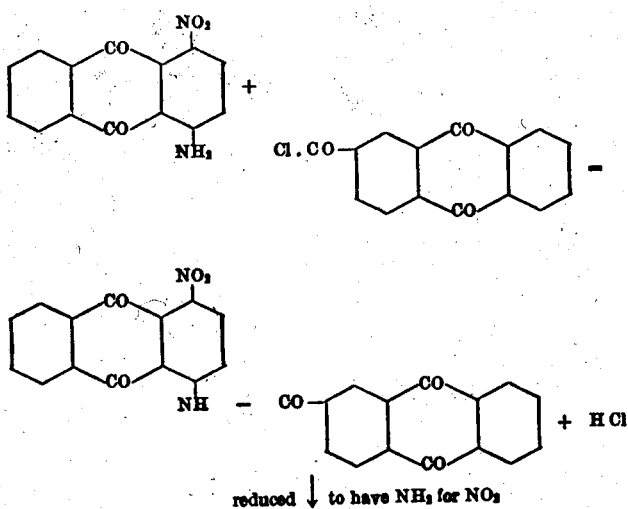

reduced ↓ to have NH$_2$ for NO$_2$

*Example 6.*

107 parts of 1-amino-anthraquinone-2-carboxylic acid, 1500 parts of trichlorbenzene and 60 parts of thionylchlorid are stirred at between 70 degrees and 75 degrees centigrade for half an hour. The temperature is then raised to about 85 degrees while passing a current of air through the mixture until the sulfur dioxid disengaged by the reaction is expelled, whereupon 48 parts of 1.5-diaminoanthraquinone are added. The temperature is then raised to 160 degrees centigrade and maintained there for two hours. Then the mass is cooled, the reaction product filtered off, washed and dried. It is a dark red powder forming a reddish brown hydrosulfite vat and dyeing cotton red shades of excellent fastness to light. The formation of the dyestuff described in this example is represented by the following equations with structural formulas:

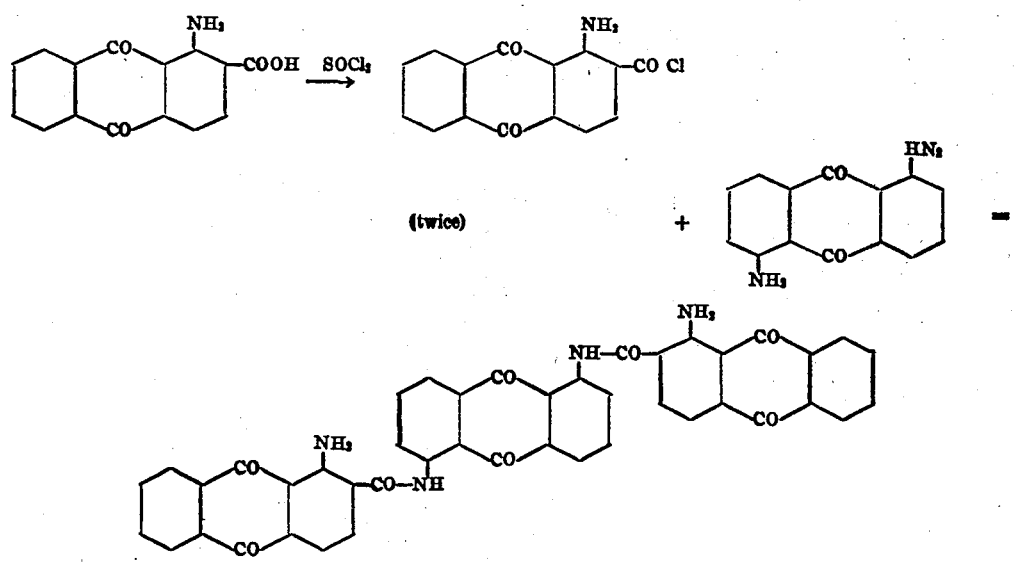

We claim:

1. As new articles of manufacture, vat coloring matters of the anthroquinone series representing anthraquinone carboxylic acid amids with a hydrogen atom of the amid group substituted by an anthraquinone residue and besides containing in one of the anthraquinone residues a group NHR in which R is a hydrogen atom or a radical other than an anthraquinone carboxylic acid residue, which coloring matters produce from orange to violet, but generally reddish shades, and dissolves in alkaline hydrosulfite solution brownish-red and are decomposed by boiling with alcoholic potassium hydroxid solution.

2. As a new article of manufacture, a vat coloring matter of the anthraquinone series which is 1.5-diaminoanthraquinone with each amino group substituted by a residue of 1-aminoanthraquinone-2-carboxylic acid, which product dyes cotton, from a brown-red hydrosulfite vat, fast red shades and which on boiling with alcoholic potassium hydroxid solution is decomposed with a formation of a red solution.

3. As new articles of manufacture, vat coloring matters of the anthraquinone series representing 1-aminoanthraquinone-2-carboxylic acid amid substituted in in the amid group attached to the carbonyl by an anthraquinone residue, which coloring matters produce from orange to violet, but generally reddish shades and dissolve in alkaline hydrosulfite solution brownish red and are decomposed by boiling with alcoholic potassium hydroxid solution.

In testimony whereof we have hereunto set our hands.

PAUL NAWIASKY.
KARL SAURWEIN.